Oct. 31, 1933.   J. C. FORD ET AL   1,932,617
PROTECTIVE COVERING AND METHOD OF PROCESSING SAME

Filed Aug. 7, 1930

INVENTORS
JOSEPH C. FORD
EINAR OLSON
BY
Hammond & Littell
ATTORNEYS

UNITED STATES PATENT OFFICE 1,932,617

PROTECTIVE COVERING AND METHOD OF PROCESSING SAME

Joseph C. Ford and Einar Olson, Madison, Wis.

Application August 7, 1930. Serial No. 473,717

18 Claims. (Cl. 215—38)

The present invention relates to cellulose products and to a method of producing and processing the same.

The invention has been developed more particularly in connection with the production and preparation for shipment and storage of a protective cap for use on bottles and the like, and for the purposes of illustrating the principles of the invention such an embodiment will be more particularly described.

Protective caps of the type to be described as illustrating one embodiment of the invention are commonly preformed to conform more or less to the shape of the bottle, can, jar or other articles to which they are to be applied and are of such character that when applied and allowed to dry they shrink to conform closely to the engaged surfaces.

The present invention provides an improved opaque cellulose material having in its final condition an opaque and glossy appearance and an improved method of processing cellulose material, whether opaque or not, whereby articles made therefrom and in what is, in fact, an intermediate condition can be reduced to a substantially dry condition for shipment and storage and thereafter re-conditioned for use and for shrinking to final condition.

It is one of the features of the invention that articles such as bottle coverings made of cellulose when made opaque by the incorporation of finely divided opaque material and processed in accordance with the invention will retain their opaque and other desirable qualities.

The nature and objects of the invention will more clearly appear upon consideration of the description of a particular illustrative embodiment for the purposes of which description reference should be had to the accompanying drawing forming a part hereof and in which—

Figure 1:
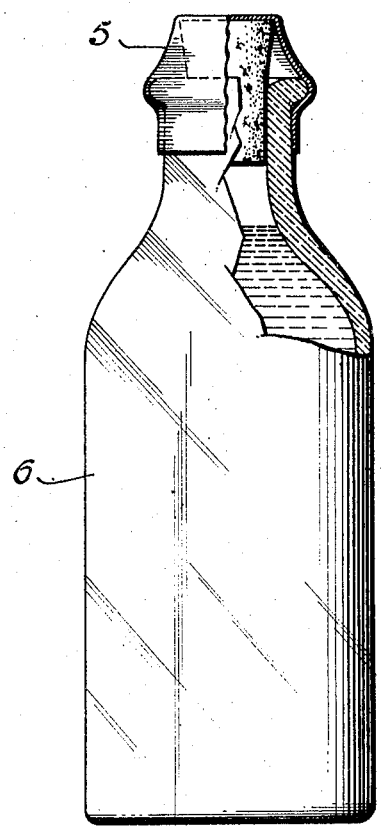
Figure 2:
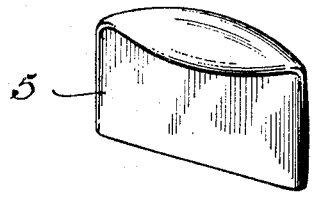

Figure 1 is a view partly in elevation and partly in section showing a bottle cap constructed in accordance with the invention, and Fig. 2 is a perspective of a similar cap prepared for shipment or storage.

The cap 5 shown in the drawing and to be described for the purposes of illustration consists of a film of cellulose which has been pre-formed and while wet has been applied to a bottle 6 and dried. During the drying the cellulose film shrinks until it contracts tightly about the bottle.

The cap shown may be formed by precipitation or regeneration from a solution of cellulose such as viscose. The cellulose film may be rendered opaque by the incorporation therein of finely divided opaque material. Conveniently this material may be introduced by chemical precipitation after the film is formed as above indicated. Sulphur can be chemically precipitated in the cellulose film in a manner to produce in the finally dried film not only the desired opacity but a glossy finish as well. The sulphur is precipitated in the form of milk of sulphur and is distributed throughout the film in such finely divided condition that a uniform opacity is effected.

Sulphur may be precipitated from solutions of sulphur compounds in many different ways, of which the following are a few examples of the method used in connection with caps formed of a film of cellulose. It can, for instance, be precipitated by the action of an acid on a solution of sodium polysulfide, according to the following formula:

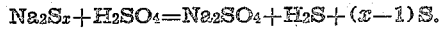

Sulphur can also be precipitated by the action of acid on a solution of sodium thiosulfate, according to the following formula:

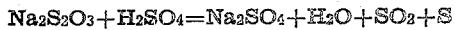

or, if an acid is added to a solution containing two molecules of sodium sulfide ($Na_2S$) for every molecule of sodium sulfite ($Na_2SO_3$) sulphur will be precipitated without the evolution of $H_2S$ according to the following formula:

In practice a combination of the above methods is used. Sodium polysulfide is formed by dissolving sulphur into a solution of sodium sulfide. To this sodium polysulfide is added sodium sulfite and sulphur is then precipitated by the addition of sulphuric acid. The following procedure has been found to be most satisfactory. The caps are soaked in a solution containing sodium polysulfide and sodium sulfite in the following proportions:

|  |  | Parts |
|---|---|---|
| Sodium polysulfide | Sodium sulfide | 13 |
|  | Sulphur | 5 |
| Sodium sulfite |  | 10 |
| Water |  | 60 |

The above solution is heated until all the sulphur has dissolved. Then, the film of cellulose in the form of a cap which is to be made opaque is immersed in this solution for from 10 to 20 minutes, depending upon the temperature. The caps are then removed and the film adhering to the surface removed as much as possible without removing the solution within the film. The product is then immersed in a 5 to 10% sulphuric acid solution and allowed to remain there for a few minutes. The caps are then removed and washed in running water to remove the acid and reaction products. The sulphur is precipitated in the film in a highly colloidal form. The films in this condition are opaque and white and may be dyed to any desired color by well known dyeing methods.

As a variation of method, solutions of sulphur compounds can be added to the viscose at any time, between the mixing and the coagulation. The sulphur will then be precipitated coincidentally with regeneration of the cellulose by acid, as described above.

Solutions of sulphur compounds may also be added to the film by immersing the film in a sulphur compound bath prior to regeneration but after or coincidentally with coagulation or forming of the film from the viscose solution. By the terms "coagulation" and "regeneration" is meant the well known process of coagulation or precipitation of cellulose xanthate from a viscose solution and regeneration of cellulose from this precipitated xanthate. This may be accomplished in one or more than one bath according to factory practice.

If, following the precipitation of sulphur, the film is then dehydrated within a few hours, the sulphur remains in this highly colloidal form in the film. If, however, the film is allowed to remain in water, the sulphur will change from a highly dispersed or almost colloidal state at the time of precipitation to particles of larger size and as the sulphur crystals increase in size, the smooth opaque effect of the film is diminished, and in fact the condition might be reached where the film of cellulose would again become transparent in substance.

If, however, shortly after precipitating the sulphur, the film is washed free of acid and reaction products and then dried, the sulphur will remain in the same highly dispersed form as it was when first precipitated. Upon drying, however, a film of hydrated cellulose in any form will shrink very considerably by the loss of water and it is necessary that this shrinking be prevented in bottle caps up to the time when they are to be applied to the bottles. It may be a matter of weeks or months before they are applied to bottles and yet it is important that the precipitated sulphur be retained in its highly dispersed form. This can be done by soaking the caps in a solution of glycerine containing a minimum of 40% glycerine solution. Then, upon extraction of the water, the glycerine remaining in the film prevents the caps from shrinking and they remain soft and pliable. It has further been found that the glycerine retained by the film upon the removal of the water has no effect upon the stability of the sulphur. The caps, then, in this form containing glycerine and in which sulphur has been precipitated as above, are ready for shipment.

Later, at the convenience of the user, they are soaked in an amount of water equivalent to about fifteen times the weight of the caps. Such soaking swells the caps to their original size and the larger part of the glycerine in the cap is replaced by water to make approximately a 5% glycerine solution.

The caps are then placed upon the bottles, allowed to dry, and as they dry they shrink. The small amount of glycerine remaining in the film is just sufficient to keep the film pliable without interferring with the shrinking.

The process outlined above is not restricted to only bottle caps, but can of course be used to make opaque cellulose films in other forms than bottle caps, as, for example, sheet cellulose, thread cellulose, tubular cellulose or any other form.

In films in which, in the dry or dehydrated form, the retention of shrinking qualities is not of prime importance, the soaking in the high percent glycerine solution may be omitted and the film may instead be soaked in a low percent glycerine solution and then dehydrated, the small amount of glycerine acting only to keep the film soft and pliable and not appreciably retarding the shrinkage.

The foregoing particular description is illustrative merely and is not intended as defining the limits of the invention.

We claim:—

1. A shrinkable protective covering preserved for shipment and storage in substantially dry condition and adapted to be applied to and shrunk on a bottle or the like to afford a protective covering comprising a pre-formed cellulose film saturated with a 40% solution of glycerine in water and dried.

2. A protective covering for bottles, and the like, comprising a shrinkable film of cellulose adapted to be applied to a bottle, or the like, and when applied to shrink, said film comprising a substantial quantity of glycerine capable of maintaining said film flexible and causing it to retain its capacity for re-shrinking after being soaked in water said glycerine corresponding to at least the amount which said film would absorb when soaked in a solution containing 40% glycerine in water.

3. A film of the character described consisting of a cellulose compound made opaque and white by a substantial proportion of free sulphur distributed therein by precipitation.

4. A protective covering comprising a pre-formed cap impregnated with milk of sulphur and having the property of shrinking to form a glossy white opaque covering when applied to an article and shrunk thereon.

5. A film of the character described consisting of a cellulose compound rendered opaque by an opaque substance distributed therein by precipitation.

6. A dry pre-formed protective covering for bottles, jars and the like comprising a shrinkable film having incorporated therein finely divided sulphur making said film opaque and glycerine as a preservative in a sufficient quantity to inhibit substantial shrinkage, said film having the capacity of being reconditioned by soaking in water to remove glycerine and thereafter shrinking to form a glossy opaque covering.

7. The method of producing a shrinkable protective covering for a bottle, jar or the like which comprises forming a cellulose film cap, impregnating said cap with a solution containing 40% of glycerine in water to maintain the flexibility of the cap and to prevent permanent shrinking when drying and, drying out the major portion of the water.

8. The method of forming and applying a protective covering to a bottle, jar or the like which comprises producing a pre-formed cellulose film, impregnating said film with sulphur or the like by chemical precipitation, impregnating said film with glycerine as a preservative for shipment and storage, removing a portion of said glycerine, and applying said covering to and shrinking it on a bottle, jar or the like.

9. The method of producing a white opaque shrinkable protective covering for a bottle, jar or the like which comprises regenerating a transparent cellulose film from a solution of cellulose such as viscose and precipitating finely divided sulphur in said film to make it opaque and white.

10. The method of producing a white opaque glossy shrinkable protective covering for a bottle, jar or the like which comprises regenerating a cellulose film from a solution of cellulose and precipitating therein free sulphur during the regenerating process to form a white opaque glossy film.

11. A shrinkable protective covering preserved for shipment and storage in substantially dry condition and adapted to be applied to and shrunk on a bottle or the like to afford a protective covering comprising a pre-formed cellulose film saturated with a 40% solution of glycerine in water and dried.

12. A protective covering for bottles, and the like, comprising a shrinkable film of cellulose adapted to be applied to a bottle, or the like, and when applied to shrink, said film comprising a substantial quantity of glycerine capable of maintaining said film flexible and causing it to retain its capacity for re-shrinking after being soaked in water, said glycerine corresponding substantially to the amount which said film would absorb when soaked in a solution containing 40% glycerine in water.

13. The method of providing a protective covering for a bottle, jar or the like which comprises forming a cellulose film cap, impregnating said cap with a solution containing 40% glycerine in water to maintain the flexibility of the cap and drying out the major portion of the water to facilitate storage of the cap, thereafter removing a portion of the glycerine and applying said cap to a bottle, jar or the like and drying the cap to shrink it on the bottle, jar or the like.

14. The method of forming and applying a protective covering to a bottle, jar or the like which comprises producing a pre-formed cellulose film, impregnating said film with sulphur or the like by chemical precipitation, impregnating said film with a 40% solution of glycerine in water and drying out the water to preserve the film for shipment and storage, removing a portion of said glycerine by soaking in water, and applying said cap to and shrinking it on a bottle, jar or the like.

15. The method of producing a shrinkable protecting cover for a bottle, jar or the like, which comprises forming a film cap from viscose, impregnating said cap with a solution containing at least 40% of glycerine in water to prevent permanent shrinking when drying, drying out the major portion of the water to form a dry cap capable of being reconditioned by soaking in water and capable thereafter of being permanently shrunk and dried.

16. The method of preserving shrinkable viscose material in condition to permit a future wetting and shrinking thereof which comprises saturating the viscose material with a solution containing 40% glycerine in water and drying out the water.

17. The method of producing a white opaque glossy protective film which comprises regenerating a transparent film from viscose solution and precipitating finely divided sulphur in said film by soaking the film in a solution containing sodium sulfide and sodium sulfite and then immersing the film in a 5 to 10% sulphuric acid solution and drying.

18. A film of the character described consisting of a cellulose compound rendered opaque and glossy by precipitation therein of a substantial proportion of sulphur.

JOSEPH C. FORD.
EINAR OLSON.